(12) United States Patent
Flynn

(10) Patent No.: US 11,091,213 B2
(45) Date of Patent: Aug. 17, 2021

(54) BICYCLE STORAGE SYSTEM

(71) Applicant: Brian N Flynn, Mukilteo, WA (US)

(72) Inventor: Brian N Flynn, Mukilteo, WA (US)

( * ) Notice: Subject to any disclaimer, the term of this patent is extended or adjusted under 35 U.S.C. 154(b) by 0 days.

(21) Appl. No.: 16/601,696

(22) Filed: Oct. 15, 2019

(65) Prior Publication Data
US 2021/0107580 A1    Apr. 15, 2021

(51) Int. Cl.
*B62H 3/08*    (2006.01)
*B62H 3/12*    (2006.01)

(52) U.S. Cl.
CPC .............. *B62H 3/08* (2013.01); *B62H 3/12* (2013.01)

(58) Field of Classification Search
CPC ... B25H 3/00; B25H 3/02; B25H 3/04; B25H 3/08; B25H 3/12
USPC ...................................................... 211/17–24
See application file for complete search history.

(56) References Cited

U.S. PATENT DOCUMENTS

| | | | | |
|---|---|---|---|---|
| 618,507 | A * | 1/1899 | Henderson | B62H 3/00 211/5 |
| 3,682,523 | A * | 8/1972 | Esposito | E04H 6/005 312/198 |
| 3,907,113 | A * | 9/1975 | Kropelnitski | B62H 3/12 211/19 |
| 5,246,120 | A * | 9/1993 | Walker | B62H 3/12 211/19 |
| 5,447,241 | A * | 9/1995 | Bureau | B62H 3/02 211/18 |
| 5,690,259 | A * | 11/1997 | Montani | B60R 9/042 224/310 |
| 5,702,007 | A * | 12/1997 | Fritz | B62H 3/08 211/17 |
| 5,772,048 | A * | 6/1998 | Sopcisak | B62H 3/00 211/196 |
| 5,842,581 | A * | 12/1998 | Graefe | B25H 1/0014 211/17 |
| 5,887,461 | A * | 3/1999 | Heffley | B62H 3/02 211/5 |
| 5,941,397 | A * | 8/1999 | Buchanan | B62H 3/12 211/19 |
| 5,996,814 | A * | 12/1999 | Workman | B25H 1/0014 211/22 |
| 5,996,870 | A * | 12/1999 | Shaver | B60R 9/06 224/324 |
| 6,866,175 | B2 * | 3/2005 | Munoz | B60R 9/06 224/324 |

(Continued)

FOREIGN PATENT DOCUMENTS

| | | |
|---|---|---|
| KR | 20120050026 | 5/2012 |
| KR | 101354612 | 1/2014 |
| NL | 20142013036 | 7/2016 |

*Primary Examiner* — Patrick D Hawn
(74) *Attorney, Agent, or Firm* — Walker Griffin Weitzel; Alloy Patent Law

(57) ABSTRACT

The present invention discloses a bike storage system that allows bicycles to be stored in a stacked manner that takes up the least space possible, while still allowing access to any bicycle in a rack without removing another bicycle. The bike storage system can also be used for transportation of the bicycles from one location to another location. When attached to a hitch mount, this rack would allow space efficient transportation of the bicycles with a vehicle. The bike storage system facilitates dual axes of rotation that allow for dense storage of bicycles while enabling ready access to any given storage slot.

13 Claims, 8 Drawing Sheets

(56) References Cited

U.S. PATENT DOCUMENTS

| | | | | |
|---|---|---|---|---|
| 6,877,613 B2* | 4/2005 | Bleazard | ............... | B62H 3/04 211/19 |
| 8,272,491 B2* | 9/2012 | Khairallah | ............ | G07F 17/10 194/211 |
| 8,733,605 B2* | 5/2014 | Pedrini | ................ | B60R 9/10 224/488 |
| 8,794,454 B2* | 8/2014 | Bleazard | ............... | B62H 3/12 211/19 |
| 8,820,543 B2* | 9/2014 | Huang | ................ | B62H 3/12 211/18 |
| 8,827,363 B2* | 9/2014 | Lagier | ............... | B61B 12/002 297/217.1 |
| 9,440,694 B2* | 9/2016 | Hudson, Jr. | ............ | B62H 3/12 |
| 9,862,439 B2* | 1/2018 | Hammond | ............ | B62H 3/02 |
| 2001/0035446 A1* | 11/2001 | Walstrom | ............... | B60R 9/10 224/501 |
| 2004/0050807 A1* | 3/2004 | Cheng | ................ | B62H 3/12 211/17 |
| 2004/0222172 A1* | 11/2004 | Bleazard | ............... | B62H 3/04 211/19 |
| 2011/0240572 A1* | 10/2011 | Kerman | ............... | B62H 3/04 211/20 |
| 2012/0006778 A1* | 1/2012 | Collins | .............. | A47F 5/0846 211/90.01 |
| 2013/0043198 A1* | 2/2013 | Bleazard | ............... | B62H 3/04 211/19 |
| 2013/0327802 A1* | 12/2013 | Hammond | ............ | B62H 3/12 224/519 |

* cited by examiner

BICYCLE STORAGE SYSTEM

TECHNICAL FIELD OF THE INVENTION

The present invention relates in general to the field of a storage system, and, more particularly, to a space-efficient bicycle storage system. The present invention facilitates storage of bicycles in a rack in a stacked manner that takes up least possible space, while still allowing access to any bicycle in the rack without removing another bicycle.

BACKGROUND OF THE INVENTION

Many bicycle users face difficulty when storing their bicycles due to the size and irregular shape of bicycles. Storage of multiple bicycles has two main problems. Firstly, it generally requires significant space, and if they are stacked together, it is difficult to gain access to any one specific bicycle. They also have stacking issues where the bars, pedals, and cables overlap each other, making it difficult to put a bicycle in the rack between two other bicycles, or remove it from the same spot. Essentially, bicycle storage systems tend to have competing goals of providing space-efficient storage while also providing good access to individual bicycles. Storage racks that provide good access tend to require a substantial amount of space, while storage racks that are space-efficient tend to hamper access to individual bikes or bike storage locations.

In addition to storage, sometimes, transportation systems are also required for transporting multiple bicycles from one location to another location. For the transportation systems, there are also several styles. One such transportation system includes a hitch-mounted tray. There are several versions of the tray style rack, which works similarly to the floor rack. The difference here is that the bicycles are accessed from the side of the bicycle. In such a scenario, only one bicycle, the last one loaded, can be accessed at a time. In order to access the back bicycle, all bicycles in the front must be unloaded and placed somewhere else. Another transportation system includes a hitch mounted vertical. These hold the bicycles in a vertical orientation so that they take up the smallest possible floor space. The handlebars are all turned, so that the bicycles can be stacked close together. However, the bicycle positions are fixed, so again, only one bicycle can be accessed at a time when the rack is fully loaded. In this type of vertical rack, only bikes located at the outermost positions are readily accessible, and therefore removal of multiple bicycles is required to access a bicycle located toward the center of the rack.

The purpose of the present invention is to provide a bike storage system that takes up least space possible and facilitates easy access to any bicycle in a rack without removing another bicycle. Also, the bike storage system should facilitate space efficient transportation of the bicycles with a vehicle.

BRIEF SUMMARY OF THE INVENTION

To minimize the limitations in the prior art, and to minimize other limitations that will be apparent upon reading and understanding the present specification, the present invention discloses a bike storage system that allows bicycles to be stored in a stacked manner that takes up the least space possible, while still allowing access to any bicycle in a rack without removing another bicycle. The bike storage system can also be used for transportation of the bicycles from one location to another location. When attached to a hitch mount, this rack would allow space efficient transportation of the bicycles with a vehicle. When groups of riders use the vehicle to shuttle multiple laps of a trail system, one person often needs to drive the vehicle back to the other end. This usually means unloading all bicycles and reloading the driver's bicycle. This rack would allow the driver's bicycle to remain in the rack, regardless of which rack position it was occupying.

In one objective of the present invention, the bike storage system includes at least a upper mount device, a vertical hinge, a rotation bearing, a front wheel basket, and a rear wheel tray. The upper mount sets spacing of racks and provides a way to mount them as a unit. The vertical hinge provides a first axis of rotation. This provides space to access any single rack. The rotational bearing is a combination of a radial bearing and a thrust bearing. This provides a second axis of rotation, where the handlebars turn. This allows the bicycles to nest closer together. The front wheel basket is a support for a front wheel. It holds the bike up when the wheel is straight and provides side support for the bike when the handlebar is turned. The rear wheel tray provides a catch for the rear wheel, so that it doesn't want to slide to the side when the front wheel is turned, or the whole bicycle is turned.

In another objective of the present invention, the space-efficient bike storage system facilitates dual axes of rotation that allow for dense storage of bicycles while enabling ready access to any given storage slot.

In another objective of the present invention, the space-efficient bicycle storage system includes a plurality of front wheel baskets, each having a first axis of rotation substantially parallel to a wall, a second axis of rotation that is substantially normal to the wall, and a plurality of real wheel trays.

These and other advantages and features of the present invention are described herein with specificity so as to make the present invention understandable to one of ordinary skill in the art, both with respect to how to practice the present invention and how to make the present invention.

BRIEF DESCRIPTION OF DRAWINGS

Elements in the figures have not necessarily been drawn to scale in order to enhance their clarity and improve understanding of these various elements and embodiments of the present invention. Furthermore, elements that are known to be common and well understood to those in the industry are not depicted in order to provide a clear view of the various embodiments of the present invention.

The novel features which are believed to be characteristic of the present invention, as to its structure, organization, use and method of operation, together with further objectives and advantages thereof, will be better understood from the following drawings in which a presently preferred embodiment of the present invention will now be illustrated by way of various examples. It is expressly understood, however, that the drawings are for the purpose of illustration and description only and are not intended as a definition of the limits of the present invention. Embodiments of this invention will now be described by way of examples in association with the accompanying drawings in which.

DETAILED DESCRIPTION OF THE INVENTION

Figure 1:
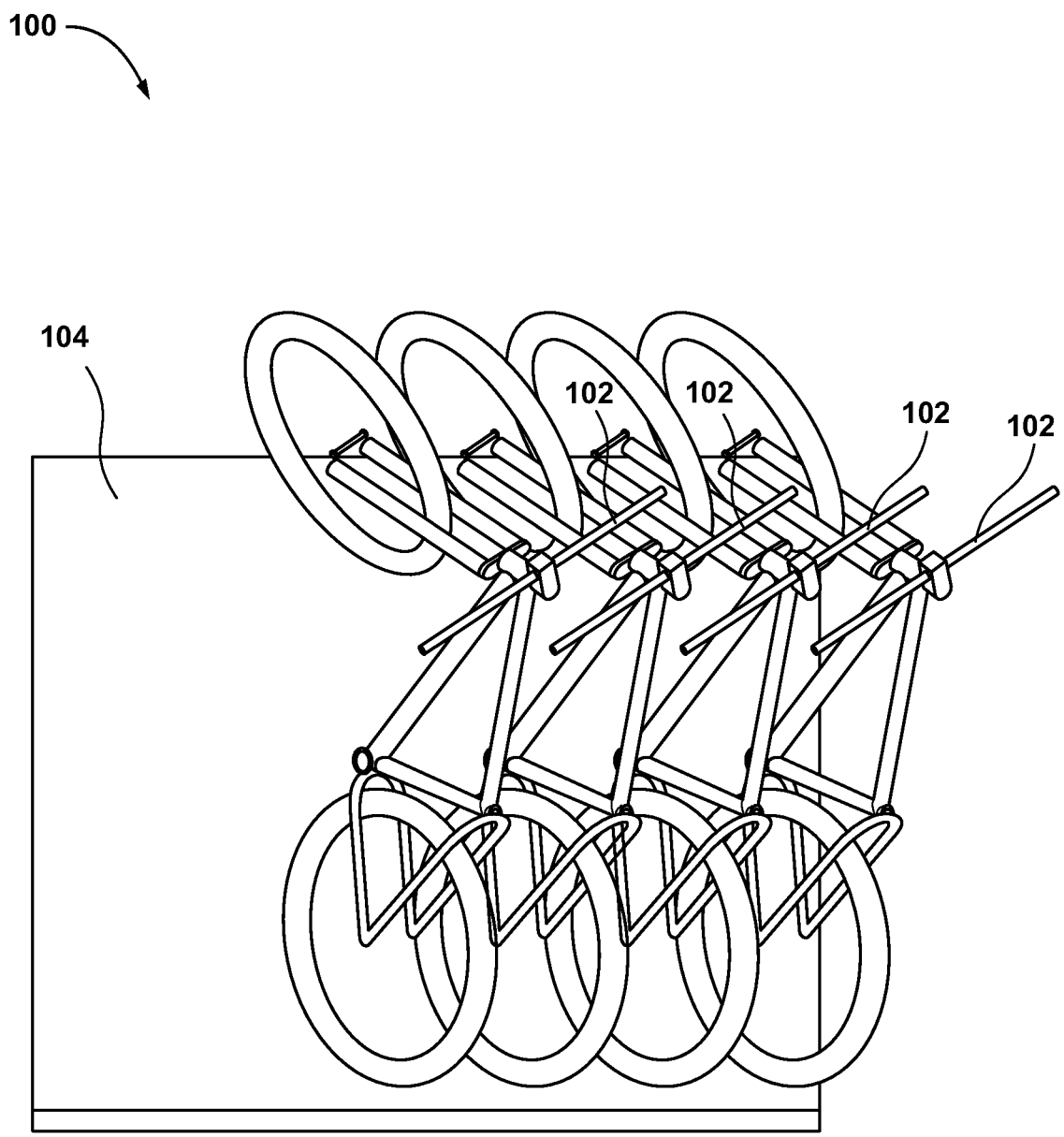
FIG. 1 is a diagram that illustrates a bike storage system storing multiple bikes, according to an exemplary embodiment of the present invention.

Certain terminology is used in the following description for reference only and is not limiting. The words "front," "rear," "anterior," "posterior," "lateral," "medial," "upper," "lower," "outer," "inner," and "interior" refer to directions toward and away from, respectively, the geometric center of the invention, and designated parts thereof, in accordance with the present disclosure. Unless specifically set forth herein, the terms "a," "an," and "the" are not limited to one element, but instead should be read as meaning "at least one." The terminology includes the words noted above, derivatives thereof, and words of similar import.

Before describing the present invention in detail, it should be observed that the present invention utilizes a combination of components, which constitutes a bike storage system for storing bicycles in a stacked manner that takes up the least space possible, while still allowing access to any bicycle in a rack without removing another bicycle. The bike storage system may also be used with a vehicle for transportation of the bicycles from one location to another location. Accordingly, the components have been represented, showing only specific details that are pertinent for understanding of the present invention so as not to obscure the disclosure with details that may be readily apparent to those with ordinary skill in the art having the benefit of the description herein. As required, the detailed embodiments of the present invention are disclosed herein. However, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the present invention.

References to "one embodiment", "an embodiment", "another embodiment", "yet another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

The words "comprising", "having", "containing", and "including", and other forms thereof, are intended to be equivalent in meaning and be open ended in that an item or items following any one of these words is not meant to be an exhaustive listing of such item or items or meant to be limited to only the listed item or items.

Unless stated otherwise, terms such as "first" and "second" are used to arbitrarily distinguish between the elements or entities. Thus, these terms are not necessarily intended to indicate temporal or other prioritization of such elements or priorities. While various exemplary embodiments of the disclosed bike storage system have been described below, it should be understood that they have been presented for purposes of example only, and not limitations. It is not exhaustive and does not limit the present invention to the precise form disclosed. Modifications and variations are possible in light of the below teachings or may be acquired from practicing of the present invention, without departing from the breadth or scope.

The bike storage system of the present invention will now be described with reference to the accompanying drawings, which should be regarded as merely illustrative without restricting the scope and ambit of the present invention.

FIG. 1 is a diagram that illustrates a bike storage system 100 storing multiple bikes 102, according to an exemplary embodiment of the present invention. The bike storage system 100 is used in cooperation with a mounting structure such as a wall 104. In alternative embodiments, the mounting structure may be a post, a pole, or any other structure having sufficient structural integrity to maintain the relative positions of the storage system 100 components. The bikes 102 (i.e., bicycles) are stacked in a specific defined pattern as shown in FIG. 1. The bikes 102 are stacked against the wall 104 as shown in FIG. 1. The wall 104 preferably is an interior wall in a storage room such as a garage, basement, or shed. The bike storage system 100 could be sufficiently weatherproofed so that the wall 104 could be an exterior wall. In general, the bike storage system 100 comprises a set of racks having one or more channels and being attached to the wall 104. The set of racks having the one or more channels facilitates stacking of the bikes 102 against the wall 104. The set of racks (as described later) is attached vertically to the wall 104 i.e., each rack is removably fixed along the vertical plane of the wall 104 as shown in FIG. 1. In an embodiment, two axes of rotation (as described later) allow the bikes 102 to nest in as small area as possible, while still being able to easily remove any bike without removing other bikes. In an embodiment, storage positions of the bikes 102 have been shown in FIG. 1, where all bikes 102 with handlebars are rotated, and frames turned to the side.

Figure 2:
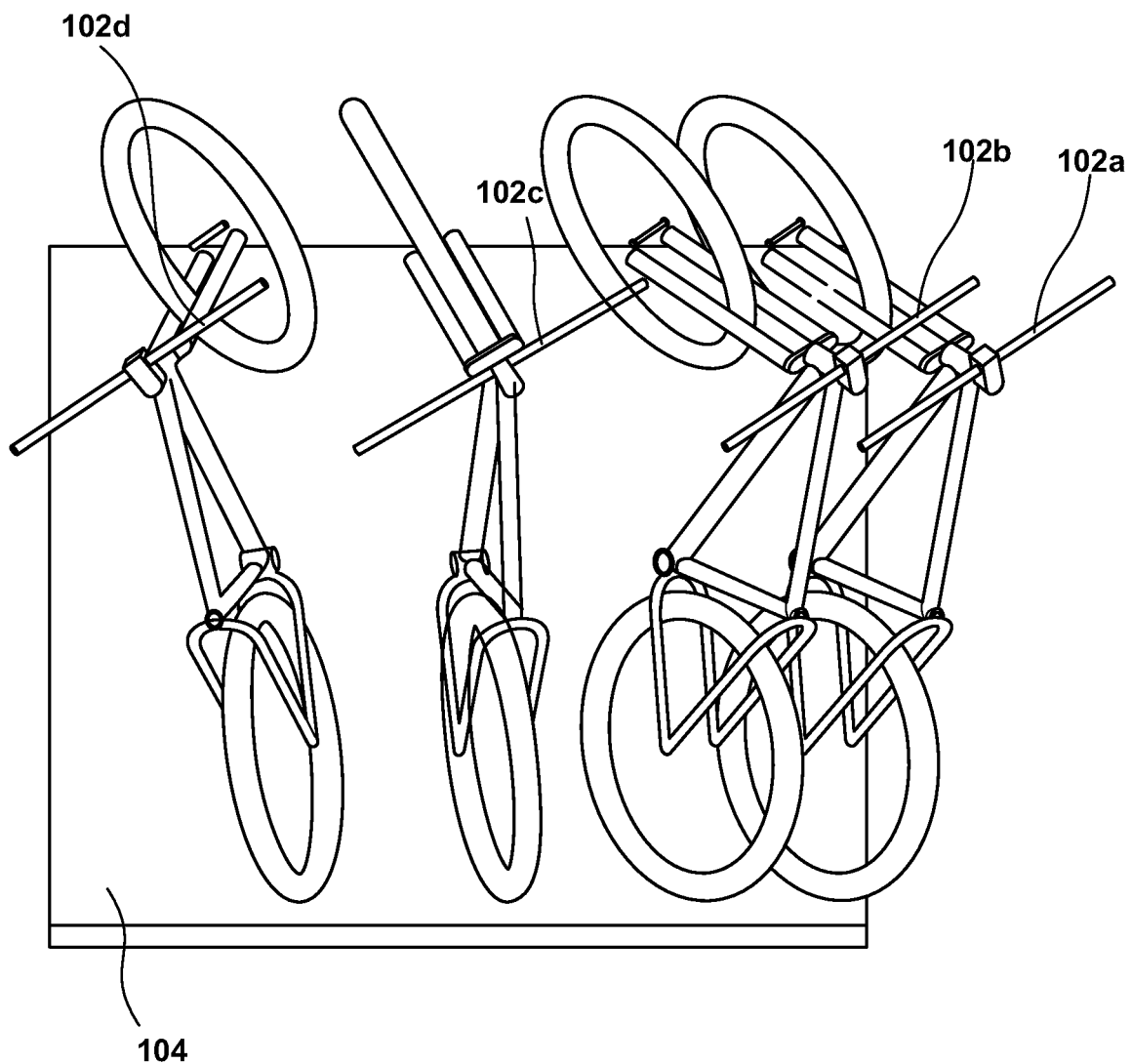
FIGS. 2 and 3, collectively, are diagrams that illustrate an exemplary scenario of the bike storage system in which a bike is being removed from the middle, according to an exemplary embodiment of the present invention.
Figure 3:
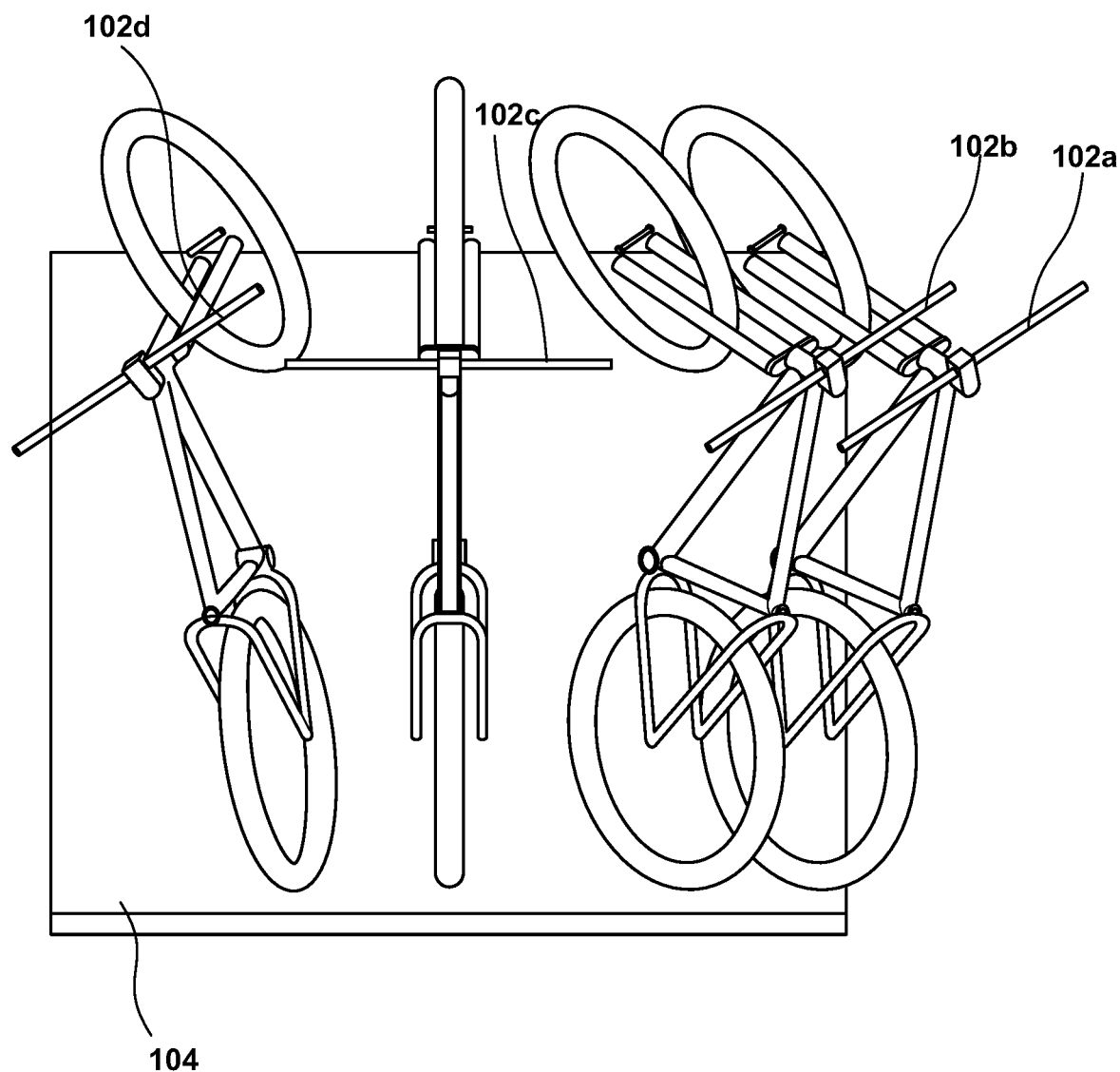

FIGS. 2 and 3, collectively, are diagrams that illustrate an exemplary scenario of the bike storage system 100 from which a bike is being removed from the middle, according to an exemplary embodiment of the present invention. Here in FIGS. 2 and 3, the bikes 102 (as shown in FIG. 1) have been separately represented as the bikes 102a-102d. Thus, in the exemplary scenario of FIGS. 2 and 3, the bike storage system 100 has been shown in which the bike 102c is being removed from the middle of the shown stacking arrangement. As previously described in conjunction with FIG. 1, the bikes 102 (i.e., the bikes 102a-102d) have been stacked against the wall 104 such that the handlebars of the bikes 102 are rotated, and frames turned to the side. In order to remove a bike (such as the bike 102c) from the middle of the shown stacking arrangement, firstly, the bike(s) 102d is turned on top of the desired bike 102c to the opposite side, and thereafter, the bike 102c is turned to perpendicular with the wall 104 as shown in FIG. 2. Thereafter, the handlebar of the bike 102c is turned straight as shown in FIG. 3. Thereafter, the bike 102c is lifted and pulled out of the respective rack.

Figure 4:
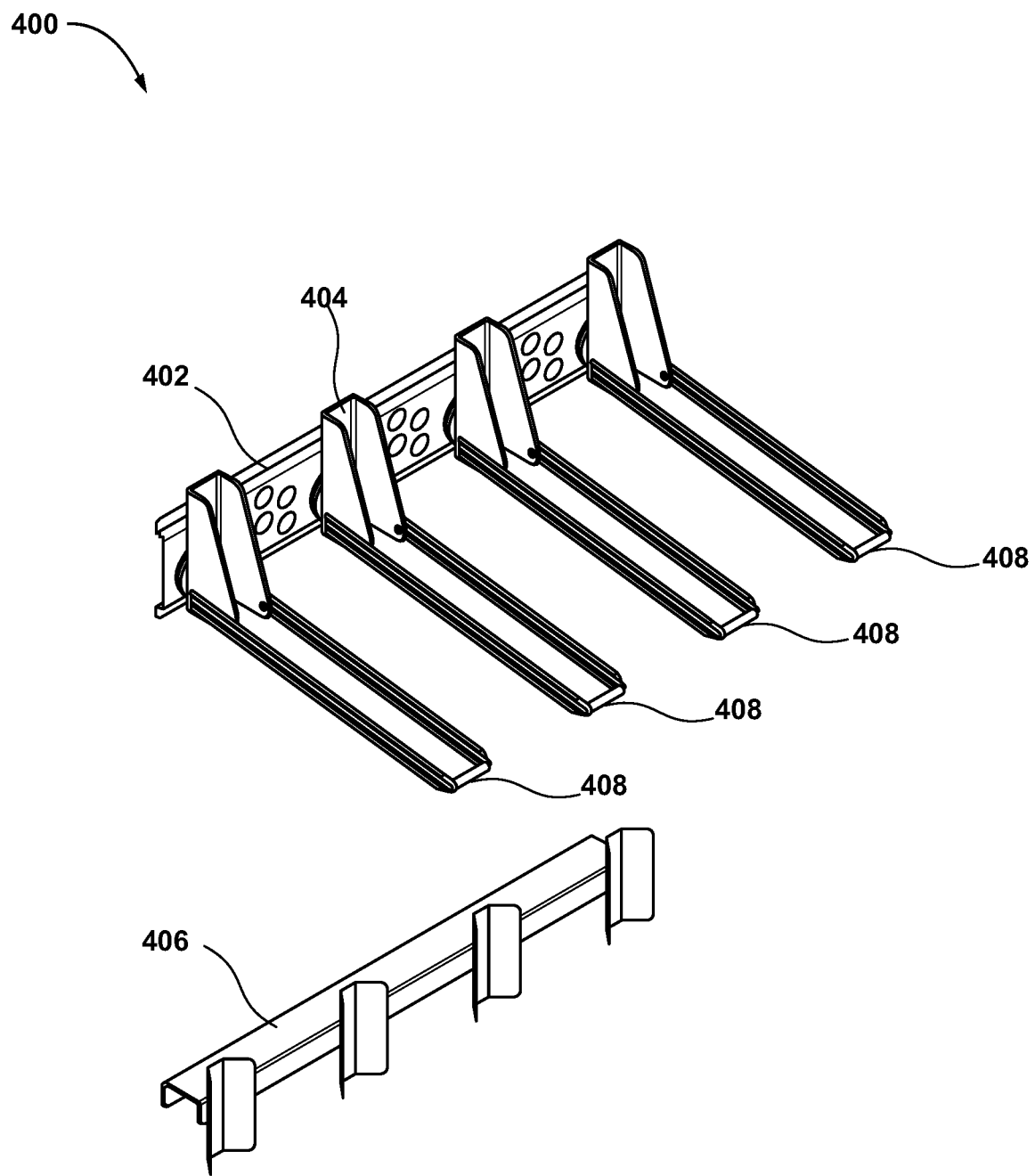
FIG. 4 is a diagram that illustrates a top perspective view of a rack design of the bike storage system, according to an exemplary embodiment of the present invention.

FIG. 4 is a diagram that illustrates a top perspective view of a rack design 400 of the bike storage system 100, according to an exemplary embodiment of the present invention. The rack design 400 includes an upper mount 402, a front wheel basket 404, and a rear wheel tray 406.

In an embodiment, the upper mount 402 sets spacing of racks 408 and provides a way to mount them as a unit. For example, the racks 408 are mounted on the upper mount 402 that may be removably fixed to the wall 104 for facilitating the stacking arrangement for storing the bikes 102. Each rack 408 is removably mounted or attached to the front wheel basket 404 that is attached to the upper mount 402 such that there is a sufficient space between two racks as shown in FIG. 4. In an exemplary embodiment, the upper mount 402 may be made up of a metallic material such as iron or steel. The upper mount 402 may be further provided with grooves for removably mounting or attaching the front wheel baskets 404.

In an embodiment, the front wheel basket 404 is a support for a front wheel of a bike such as the bikes 102. The front wheel basket 404 holds the bike (such as the bike 102a) up when the wheel is straight and provides side support for the bike when the handlebar is turned. In an exemplary embodiment, the front wheel basket 404 may be made up of a metallic material such as iron or steel. Each front wheel basket 404 may be removably mounted or attached to each rack 408. The front wheel basket 404 may be of many different forms. It simply needs to have a bottom support to hold the wheel up, and sufficient side support to hold the wheel when the handlebar has been turned.

In an embodiment, the rear wheel tray 406 provides a catch for the rear wheel of the bike 102, so that it doesn't want to slide to the side when the front wheel is turned, or the whole bicycle is turned. In an exemplary embodiment, the rear wheel tray 406 may be made up of a metallic material such as iron or steel.

As shown in FIG. 4, various front wheel baskets (such as the front wheel basket 404) is located on top row. The front wheel of each bike 102 rests in between a back plane and a front cylinder support such as the rack 408. The rear wheel of each bike 102 supports on a bottom row provided by the rear wheel tray 406 and holds the rear wheel from swinging.

The exemplary scenario depicted in FIGS. 2 and 3 shows the rack in a wall-mounted implementation, wherein the upper mount 402 and the rear wheel tray 406 are fixed in relative position by mounting each component to a wall. In alternative embodiments, the upper mount 402 and the rear wheel tray 406 may be fixed to a freestanding post, a post adapted to mount to a trailer hitch such that the storage system is useable for transporting bikes via car or truck, or any other method of substantially fixing the relative positions of the upper mount 402 and the rear wheel tray 406.

Figure 5:
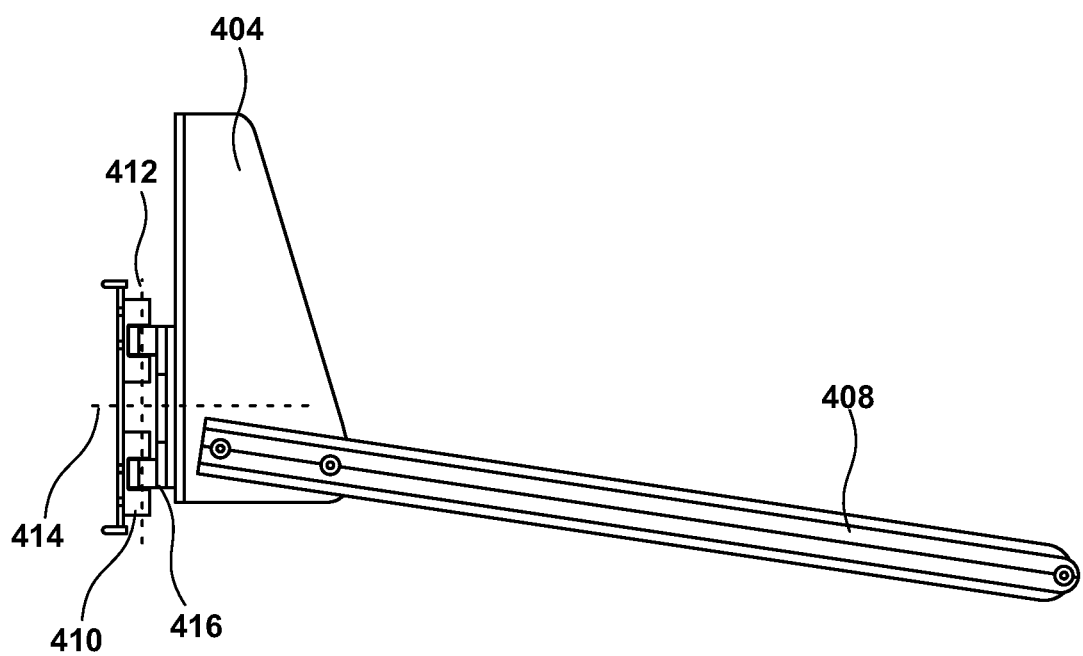
FIG. 5 is a diagram that illustrates a side view of a front wheel basket of the bike storage system, according to an exemplary embodiment of the present invention.

FIG. 5 is a diagram that illustrates a side view of the front wheel basket 404 of the bike storage system 100, according to an exemplary embodiment of the present invention. The front wheel basket 404 is a support for the front wheel of each of the bikes 102. The front wheel basket 404 holds the bike (such as the bike 102a) up when the wheel is straight and provides side support for the bike when the handlebar is turned. In FIG. 5, there is further shown a vertical hinge 410, a first axis of rotation 412, a second axis of rotation 414, and a rotational bearing 416.

The vertical hinge 410 is provided with the front wheel basket 404, each having the first axis of rotation 412 substantially parallel to the wall 104, the second axis of rotation 414 that is substantially normal to the wall 104, and a plurality of real wheel trays such as the rear wheel tray 406. In an embodiment, the vertical hinge 410 provides the first axis of rotation 412 where the bikes 102 may fold, for example, like pages in a book. This provides space to access any single rack 408.

In an embodiment, the rotational bearing 416 is a combination of a radial bearing and thrust bearing. The rotational bearing 416 provides the second axis of rotation 414, where the handlebars of each bike 102 may turn. This allows the bikes 102 to nest closer when they are stacked together. The handlebar rotation bearing setup (i.e., the rotational bearing 416) may take several forms. Essentially what is required is a radial bearing, and a moment carrying member. The current design accomplishes this with a sleeve bushing and a thrust bearing. It could also be a slewing ring, or even a single radial bearing if it was able to carry the moment.

In an embodiment, the two rotational axes (i.e., the first axis of rotation 412 and the second axis of rotation 414) are provided to help the bikes 102 nest as close as possible. The first axis of rotation 412 is provided for frame turn and the second axis of rotation 414 is provided for handlebar rotation.

Figure 6:
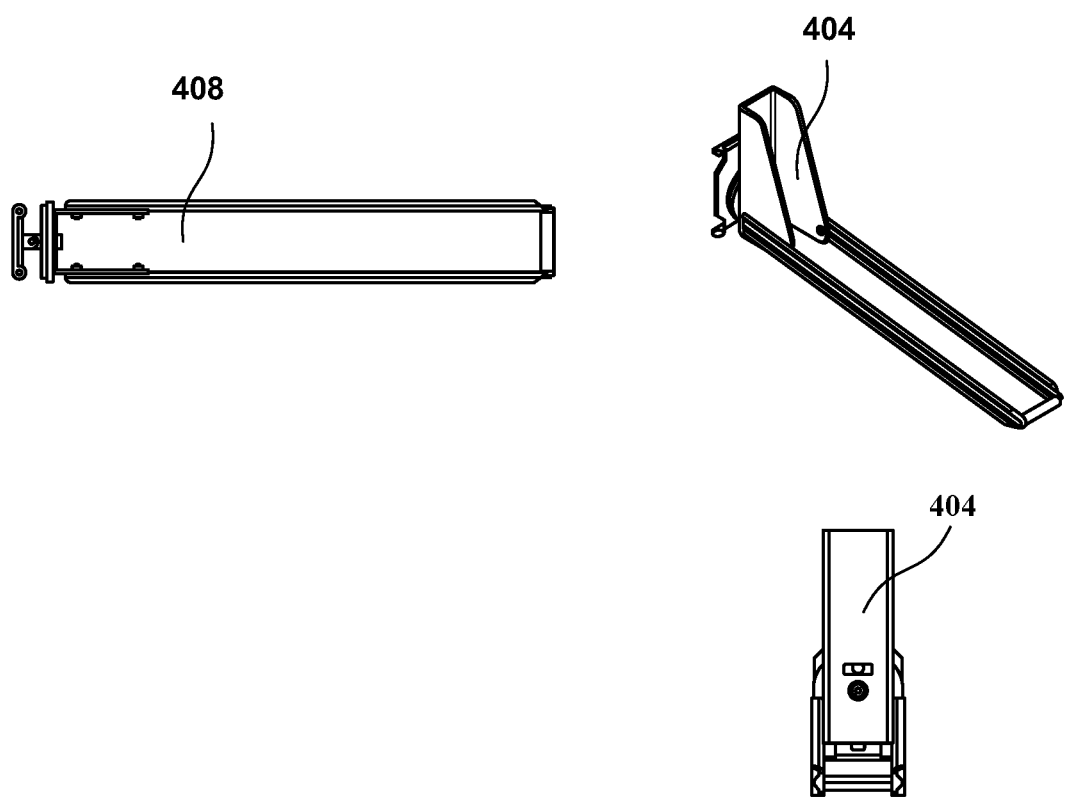
FIG. 6 is a diagram that illustrates loading positions associated with the bike storage system, according to an exemplary embodiment of the present invention.

FIG. 6 is a diagram that illustrates loading positions associated with the bike storage system 100, according to an exemplary embodiment of the present invention. During the loading position, the first axis of rotation 412 is parallel to the wall 104 and the second axis of rotation 414 is upright.

Figure 7:
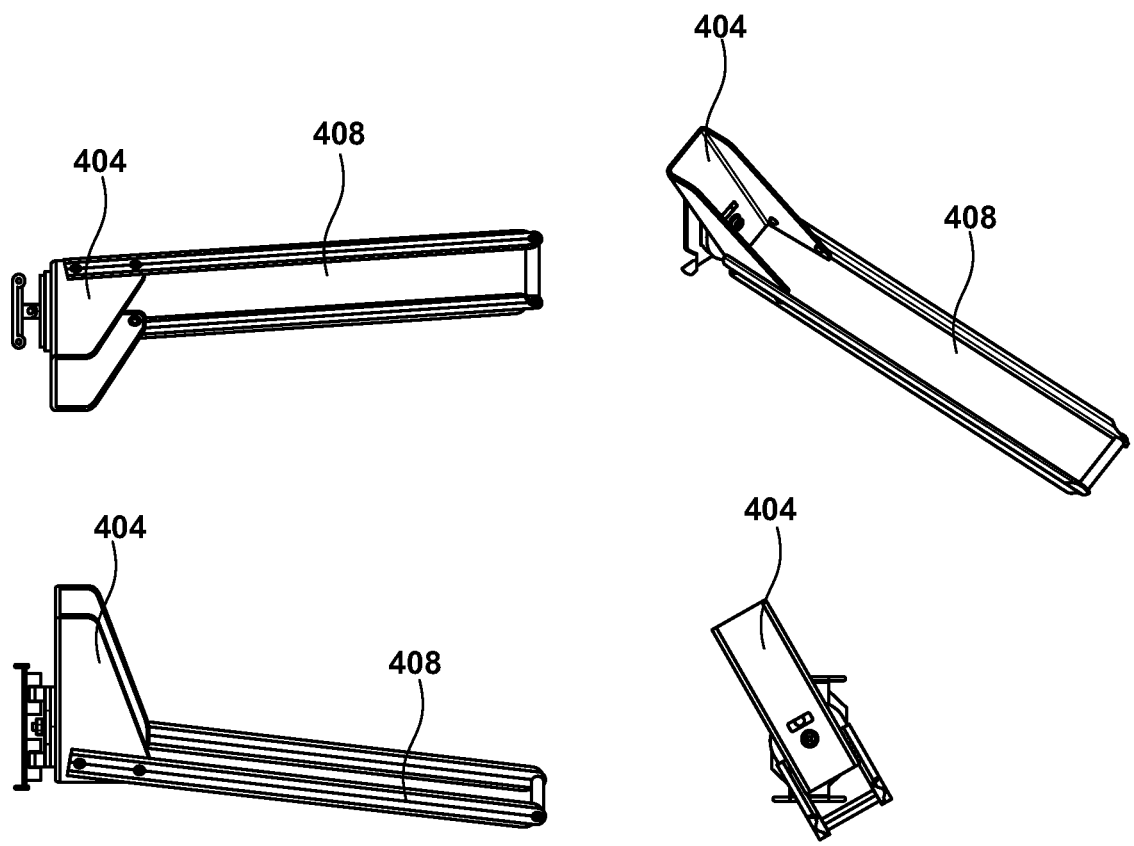
FIG. 7 is a diagram that illustrates intermediate positions associated with the bike storage system, according to an exemplary embodiment of the present invention.

FIG. 7 is a diagram that illustrates intermediate positions associated with the bike storage system 100, according to an exemplary embodiment of the present invention. During the intermediate positions, the first axis of rotation 412 is parallel to the wall 104 and the second axis of rotation 414 is rotated to end of travel.

Figure 8:
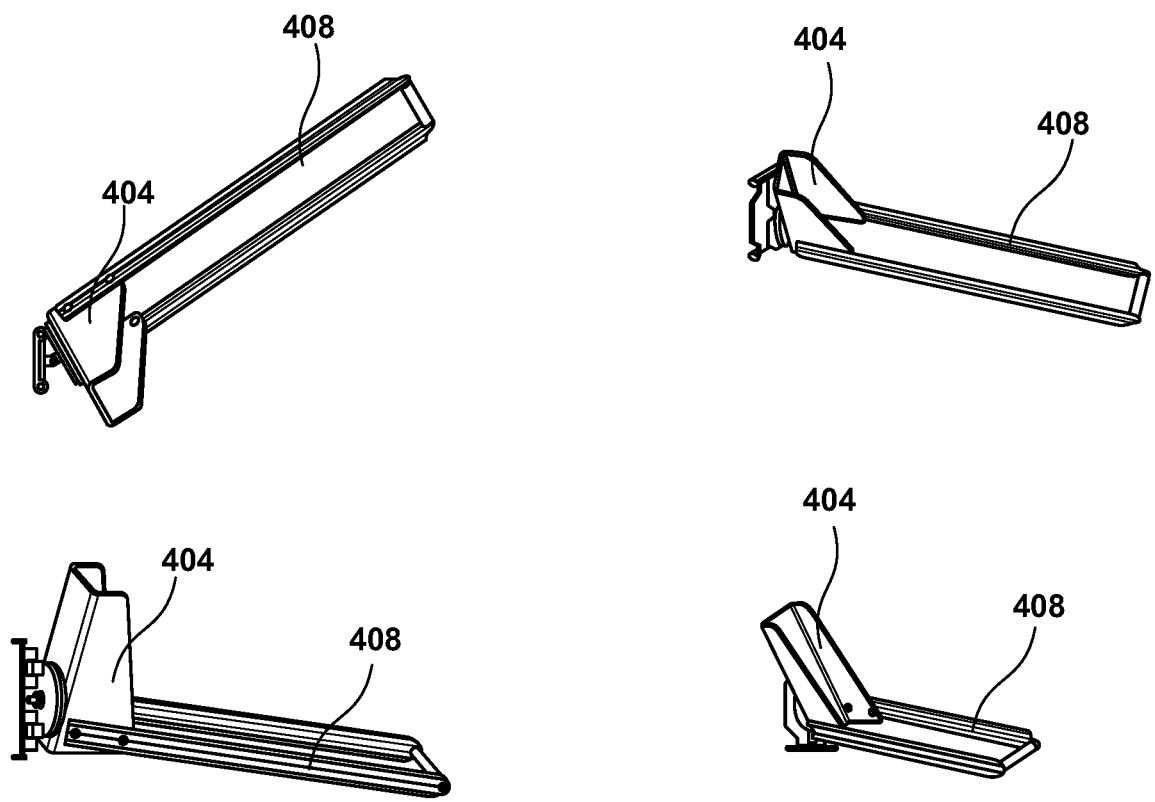
FIG. 8 is a diagram that illustrates storage positions associated with the bike storage system, according to an exemplary embodiment of the present invention.

FIG. 8 is a diagram that illustrates storage positions associated with the bike storage system 100, according to an exemplary embodiment of the present invention. During the storage positions, the first axis of rotation 412 is turned in towards the wall 104 and the second axis of rotation 414 is rotated to end of travel.

In an embodiment, the dual axes of rotation (i.e., the first axis of rotation 412 and the second axis of rotation 414) allow for dense storage of the bikes 102 while enabling ready access to any given storage slot such as one indicated by a combination of the front wheel basket 404 and the corresponding rack 408. The front wheel basket 404 incorporates the dual axes of rotation, which permits both dense packing, as well as the ability to "page" through the stored bicycles, permitting ready access to any given stored bicycle or vacant storage slot.

In some embodiments, the rear wheel tray 406 may be removed, and it would still mostly work, but the bicycles would slide into each other. In some scenarios, the second axis of rotation 414 may also be removed, such that the handlebar is always turned. This would allow the bicycles to stack close to each other, and still allow any bicycle in any rack position to have good access. However, it becomes much more difficult to get a bicycle into or out of the rack.

There are some tire width and wheel diameter considerations. Most mountain bike tires are 2-3 inches wide, but there are some that are wider that would not fit. Similarly, the narrow road bike tires will fit, but not as well. The front wheel rest contact points are sized for the standard adult sized mountain and road bike tires, but will not properly hold a smaller wheel. Modifications for these are simple, for example, moving the placement of the wheel rests, and changing the width of the basket. Front fenders will also cause the rack not to work. A different front wheel support system could possibly be used to make this work.

While the invention has been described in connection with what is presently considered to be the most practical and preferred embodiments, it is to be understood that the invention is not to be limited to the disclosed embodiments, but, on the contrary, is intended to cover various modifications and equivalent arrangements included within the spirit and scope of the appended claims.

What is claimed is:

1. A bike storage system, comprising:
    an upper mount;
    a vertical hinge;
    a plurality of front wheel baskets attached to the upper mount and a plurality of racks, wherein each front wheel basket is attached to the upper mount by means of the vertical hinge, and wherein the plurality of racks are removably fixed to the plurality of front wheel baskets such that the plurality of racks are along a vertical plane of a mounting structure; and
    a rotational bearing, wherein
        the upper mount sets spacing of racks and provides a way to mount them as a unit,
        the vertical hinge provides a first axis of rotation that is substantially parallel to the mounting structure,
        the plurality of front wheel baskets provide a support for a front wheel of a plurality of bikes through a channel of the plurality of racks such that the front wheel of each of the plurality of bikes is supported by a respective rack at two locations that are separated from one another in both horizontal and vertical directions with one location being at a distal end of the rack and one being at an inner portion of the rack, and
        the rotational bearing provides a second axis of rotation that is substantially normal to the mounting structure, wherein the second axis of rotation is used for turning a handlebar of each of the plurality of bikes, and wherein the bike storage system is designed for allowing packing of the plurality of bikes at a distance closer than a width of the handlebar, and wherein the plurality of bikes are positioned at substantially the same height from the floor and the same distance from the mounting structure.

2. The bike storage system of claim 1, wherein the upper mount is removably fixed to the mounting structure for facilitating storage of the plurality of bikes, and wherein the mounting structure corresponds to a wall.

3. The bike storage system of claim 1, further comprising a rear wheel tray that is mounted separately from a rack arrangement including the plurality racks.

4. The bike storage system of claim 3, wherein the vertical hinge provides the first axis of rotation where the plurality of bikes fold.

5. The bike storage system of claim 3, wherein the rear wheel tray provides a catch for a rear wheel of each of the plurality of bikes, so that it doesn't slide to a side when the front wheel is turned, or the whole bike is turned.

6. The bike storage system of claim 5, wherein the rear wheel of each of the plurality of bikes supports on a bottom row provided by the rear wheel tray and holds the rear wheel of each of the plurality of bikes from swinging.

7. The bike storage system of claim 1, wherein the plurality of front wheel baskets holds the plurality of bikes up when the front wheel is straight and provides side support for the plurality of bikes when the handlebar is turned.

8. The bike storage system of claim 7, wherein the plurality of front wheel baskets is attached to the upper mount such that there is a space between two racks.

9. The bike storage system of claim 7, wherein the plurality of front wheel baskets are located on a top row and are removably attached to the plurality of racks.

10. The bike storage system of claim 1, wherein the rotational bearing is a combination of a radial bearing and a thrust bearing, which provides the second axis of rotation.

11. The bike storage system of claim 1, wherein the rotational bearing is at least one of a slewing ring or a single radial bearing.

12. The bike storage system of claim 1, wherein the first axis of rotation and the second axis of rotation are provided to help the plurality of bikes nest as close as possible to each other, and wherein the first axis of rotation is provided for frame turn and the second axis of rotation is provided for handlebar rotation.

13. The bike storage system of claim 1, wherein, during a loading position, the first axis of rotation is parallel to a wall and the second axis of rotation is upright to the wall.

* * * * *